United States Patent Office 3,474,864
Patented Oct. 28, 1969

3,474,864
METHOD OF DESORBING SURFACTANT AND REUSING IT IN FLOODING WATER
Billy G. Hurd, Dallas, Tex., assignor to Mobil Oil Corporation, a corporation of New York
Filed Oct. 9, 1967, Ser. No. 673,882
Int. Cl. E21b 43/22
U.S. Cl. 166—272          12 Claims

ABSTRACT OF THE DISCLOSURE

This specification discloses a method of using more effectively surfactant in a flooding operation employing a saline flooding water to recover oil from an oil-containing subterranean formation. Specifically, following the injection into a subterranean formation of an aqueous, saline solution of surfactant, there is injected into the formation a slug of less-saline water, which may be formed by the condensation of injected steam. The slug of less-saline water desorbs the surfactant, builds a second bank of surfactant solution, and enables traversing substantially the entire formation with surfactant solution, thus effecting more nearly complete recovery of oil therefrom.

BACKGROUND OF THE INVENTION

This invention pertains to recovery of petroleum from a subterranean formation. More particularly, this invention pertains to recovering petroleum from a subterranean formation by waterflooding.

The petroleum, more commonly called crude oil or simply oil, accumulated in subterranean formations is recovered or produced therefrom through wells drilled into the subterranean formation. A large amount of the oil is left in the subterranean formation if produced only by primary depletion, i.e., where only the initial formation energy is used to recover the oil. Where the initial formation energy is inadequate or has become depleted, supplemental operations are employed. The supplemental operations are often referred to as secondary recovery operations although, in fact, they may be primary or tertiary in sequence of their employment.

In a successful and widely used supplemental operation, a fluid is injected through injection means, comprising one or more injection wells, and passed into the formation. Oil is displaced within and is moved through the formation, and is produced through production means comprising one or more wells, as the injected fluid passes from the injection means toward the production means. In a particular recovery operation of this sort, water is employed as the injected fluid and the operation is referred to as a waterflood. The injected water is referred to as the flooding water, as distinguished from the in-situ, or connate, water. The flooding water customarily employed is oil field brine because of its availability and oil field brines ordinarily contain at least 1 percent by weight of sodium chloride.

Waterflooding is a useful method of supplementing recovery of oil from subterranean formations. It has, however, a relatively poor microscopic displacement efficiency. The microscopic displacement efficiency may be defined as the ratio of the amount of oil displaced from the pore space of the portion of the formation through which the water has passed to the original amount of oil therein. Adding surfactants to a portion of the flooding water to form a surfactant solution has been suggested for improving this microscopic displacement efficency. However, employing adequate surfactant to enhance the recovery of oil from the subterranean formation by the flooding water has not been economically feasible heretofore because the surfactants are adsorbed from the surfactant solution onto the surfaces of the pores of the subterranean formation. As a result of this adsorption of the surfactant, the concentration of the surfactant in the flooding water becomes less than that required to achieve enhanced recovery of the oil. Moreover, the adsorption, where the surfactant is a mixture, causes a chromatographic dispersion to separate components of the surfactant mixture on the basis of molecular weights. Frequently, this dispersion destroys the efficacy of the surfactant mixture in lowering the interfacial tension between the flooding water and the oil being displaced within the formation.

SUMMARY OF THE INVENTION

The invention provides an enhanced recovery of oil from an oil-containing subterranean formation where a saline surfactant solution is employed along with, as flooding water, an oil field brine. By "oil field brine" is meant an aqueous solution containing at least 1 percent by weight of sodium chloride. In accordance with the invention, the enhanced recovery is obtained by the steps comprising: (1) injecting through an injection well and into the subterranean formation an aqueous, saline surfactant solution, (2) injecting through the injection well and into the subterranean formation a slug of less-saline water having a lower salinity than the saline surfactant solution injected in step (1), and (3) injecting flooding water through the injection means. The surfactant adsorbed onto the surface of the subterranean formation from the aqueous, saline solution of surfactant is desorbed by the slug of less-saline water. Stated otherwise, the slug of less-saline water will effect desorption under a constant desorption potential, defined and illustrated hereinafter, from the subterranean formation, thus building a second bank of surfactant which will continue to build in concentration, even as the concentration of surfactant in the aqueous, saline surfactant solution decreases.

By "salinity," reference is being made to sodium chloride.

DESCRIPTION OF SPECIFIC EMBODIMENTS

Figure 1A:
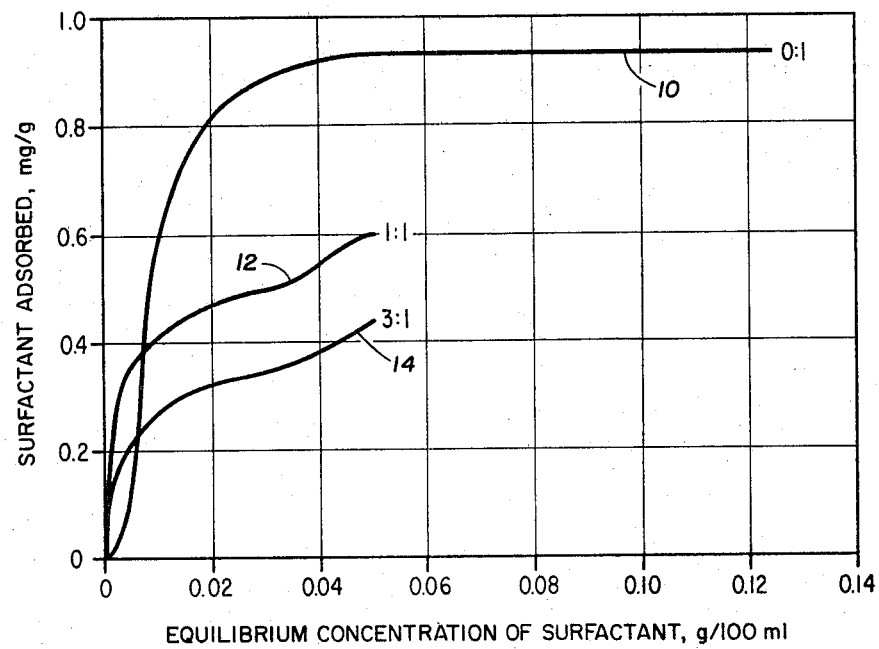
FIGURES 1a and 1b are adsorption isotherms for a surfactant in flooding water containing varying salinities.

Any surfactant which will effect an interfacial tension between the flooding water and the oil being displaced within the subterranean formation of less than about 0.1 dyne per centimeter can be employed. Illustrative of suitable surfactants are the alkyl aryl poly(ethoxy)ethanols in which the alkyl aryl groups impart an oil solubility slightly greater than the water solubility imparted by the poly(ethoxy)ethanol groups. Satisfactory surfactants from this group include octyl or nonyl phenol having 4 to 6 ethoxy groups in the poly(ethoxy) group. Other suitable surfactants include the long chain alkyl sulfonates and the alkyl aryl sulfonates. Preferred surfactants are restricted mixtures of petroleum sulfonates having a median molecular weight of from about 375 to about 430, having molecular weights between 290 and 590, no more than 10 percent by weight having an average molecular weight less than 290, and having no more than 15 percent by weight of an average molecular weight greater than 590. Hereinafter, the petroleum sulfonates described above are referred to by the term "the restricted petroleum sulfonates." Particularly preferred surfactants are the restricted petroleum sulfonates having a median molecular weight of from about 400 to about 430 and otherwise having the molecular weight distribution of the restricted petroleum sulfonates outlined above. These particularly preferred petroleum sulfonates are referred to herein as "the preferred restricted petroleum sulfonates."

The molecular weights of the petroleum sulfonates referred to above and hereinafter are those of the sodium salts. Moreover, the term "molecular weight" should be understood to mean equivalent weight, which is defined as molecular weight per sulfonate group. The term "molecular weight" is used because it is commonly applied by manufacturers of petroleum sulfonates in describing their products.

The surfactant should be employed in an amount sufficient to reduce the interfacial tension between the aqueous, saline surfactant solution and the oil to below 0.1 dyne per centimeter. Preferably, the surfactant is employed in an amount which will effect an interfacial tension of from about 0.01 to about 0.001 dyne per centimeter, or less. Ordinarily, a concentration of surfactant prior to injection of from about 0.01 percent by weight to about 25 percent by weight is adequate. When the restricted petroleum sulfonates or the preferred restricted petroleum sulfonates are employed as the surfactant, the lowest interfacial tensions are effected between the surfactant solution and the oil being displaced within the formation by a concentration of surfactant within the formation of from about 0.01 to about 0.5 percent by weight of the surfactant solution.

As mentioned, there is a chromatographic dispersion of surfactant effected by adsorption of the surfactant on the surfaces of the pores of subterranean formations, the higher molecular weight surfactants being adsorbed preferentially to the lower molecular weight surfactants. Accordingly, it is preferred, when employing mixtures of petroleum sulfonates as the surfactant, that the aqueous, saline surfactant solution prior to injection contain a concentration of the higher molecular weight component higher than 0.5 percent by weight to effect the desired concentration of the higher molecular weight component in the aqueous, saline surfactant solution after injection into a subterranean formation. Thus, with petroleum sulfonates, the aqueous, saline surfactant solution should contain a concentration of from about 1 to about 25 percent by weight of the restricted petroleum sulfonates, or the preferred restricted petroleum sulfonates, or of at least the higher molecular weight components thereof.

The presence of the sodium chloride in the aqueous surfactant solution effects a lower interfacial tension between the surfactant solution and the oil in the formation than would be effected in the absence of the sodium chloride. The microscopic displacement efficiency of the aqueous, saline surfactant solution is inversely proportional to the interfacial tension between the solution and the oil. Consequently, the presence of the sodium chloride in the aqueous surfactant solution improves the microscopic displacement efficiency of the surfactant solution. Thus, from the standpoint of obtaining maximum recovery of oil, aqueous surfactant solutions for injecting into a subterranean formation will contain sodium chloride. Moreover, the presence of the sodium chloride in the aqueous surfactant solution reduces swelling and dispersion of clays in the formation, which swelling and dispersion reduces the permeability of the formation to injected liquid. The surfactant solution will contain about 1 to 2 percent by weight of sodium chloride. Further, the waters available in oil fields for the preparation of surfactant solution for injection into a subterranean formation ordinarily contain sodium chloride in addition to other dissolved salts. Thus, often from the standpoint of practicality, as well as from the standpoint of obtaining maximum recovery of oil, the aqueous surfactant solutions for injecting into a subterranean formation will be saline. On the other hand, the presence of sodium chloride in the aqueous surfactant solution is conducive to adsorption of the surfactant on the surfaces of the pores of the formation. Moreover, while the presence of sodium chloride in the surfactant solution decreases the interfacial tension between the surfactant solution and the oil in the formation, a high concentration of sodium chloride is incompatible with the surfactant. Preferably, the saline surfactant solution should not contain in excess of the 2 percent by weight of sodium chloride. Further, salts having divalent cations, i.e., calcium and magnesium salts, are also chemically incompatible with the surfactant and, preferably, the saline surfactant solution is essentially free of such salts.

It is to be preferred that the aqueous, saline surfactant solution will become depleted of surfactant at about midway through the flooding operation. From about this point, then, the slug of water having a lower salinity which will have desorbed surfactant from the formation to build up a high concentration of surfactant therein will begin to lose surfactant by adsorption, will displace oil as it moves toward a production well, and will become depleted of surfactant just as it breaks through at a production well. Thus, the surfactant is reused and effects more nearly complete microscopic displacement of the oil throughout the formation.

Ordinarily, an oil field, in addition to being a source of the oil field brine, will be a source of water which is fresher than the oil field brine. The term "fresher" is employed in its usual sense to mean less-saline. The fresher water may be fresh water from rivers, lakes, waste water storage ponds, or fresh water aquifers. Further, the fresher water may simply be water that naturally contains less dissolved salt and is obtained from a different subterranean formation.

By combining waters from different sources, it is usually practical to obtain water of any desired salinity for use (1) in preparing the aqueous, saline surfactant solution, (2) as the less-saline water, and (3) as the flooding water. In practicing the invention, it is preferred, as mentioned, that the aqueous, saline surfactant solution contain from about 1 to about 2 percent by weight of salt. Further, the slug of less-saline water should have a concentration of sodium chloride less than 50 percent of that of the aqueous, saline surfactant solution. As mentioned previously, salts having divalent cations are chemically incompatible with the surfactant. Further, as also mentioned previously, the less-saline water desorbs the adsorbed surfactant from the surface of the subterranean formation to build up a second bank of surfactant. Accordingly, the less-saline water is also preferably essentially free of salts having divalent cations. The concentration of sodium chloride in the slug of less-saline water is as low as consistent with maintaining an adequately high rate of injection into the subterranean formation and with maintaining an adequately low interfacial tension between the solution and the oil. Thus, in most formations, the concentraton of sodium chloride in the slug of less-saline water can be as low as 10 to 20 percent of that of the aqueous, saline surfactant solution. In many formations, the slug of less-saline water can be fresh water.

The aqueous, saline surfactant solution may be injected into the formation in the amount of from about 0.01 to about 0.2 pore volume. Greater volumes of surfactant solution may be employed and will recover additional oil. However, the additional oil recovered may have a value less than the cost of employing the greater volumes of the aqueous, saline solution of surfactant.

The slug of less-saline water should be injected into the formation in the amount of from about 0.05 to about 0.2 pore volume. Ordinarily, a volume of from about 0.1 to about 0.2 pore volume of the less-saline water will be injected into the formation.

As previously indicated, some subterranean formations contain concentrated brines having high salinity, for example, about 4 percent or higher by weight of salt. Such concentrated brines often also contain appreciable concentration of divalent cations. In order to prevent any adverse reactions between the aqueous, saline surfactant solution and such concentrated brines within the subterranean formation, a buffer slug of from about 0.01 to about 0.2 pore volume, inclusive, of water having about the same salinity as the aqueous, saline surfactant solution and specifically containing less than 2 percent by weight sodium chloride, the water being preferably essentially free of salts having divalent cations, is injected through the injection well and into the subterranean formation ahead of the aqueous, saline surfactant solution. The buffer water miscibly displaces the concentrated brine, leaving an environment with which the surfactant solution is chemically compatible.

In cases where the flooding water is a concentrated brine and is injected behind the slug of less-saline water, a buffer slug of from about 0.01 to about 0.2 pore volume, inclusive, of water having a salinity not greater than that of the slug of less-saline water and preferably essentially free of salts having divalent cations should be injected through the injection means and into the subterranean formation behind the less-saline water and in front of the flooding water. Such a buffer slug of water prevents the concentrated brine comprising the flooding water from intermingling with and producing adverse chemical reactions with the surfactant in the less-saline water desorbed from the formation.

As mentioned, there are formations containing clays which swell and disperse upon contact with water of low salinity. In such formations, where the slug of less-saline water may reduce the permeability, steps may be taken to reduce or avoid the reduction in permeability. For example, the clay can be stabilized. In this connection, stabilization need be effected only for about the first ten feet around an injection well since the overall matrix and fractures native to a subterranean formation will prevent reduction in permeability below an acceptable value beyond this distance even with swelling and dispersion of clays. Further, the clays in the region of the injection well need to be stabilized with respect to swelling and dispersion only long enough to inject the slug of less-saline water of from about 0.05 to about 0.2 pore volume, and any buffer water injected between the slug of less-saline water and the flooding water. Various processes for stabilizing clays in subterranean formations in the presence of fresh water have been described. For example, the clays may be stabilized by contacting with water containing potassium salts. The clays may also be stabilized by irreversibly dehydrating them by heating. For example, superheated steam may be injected into the formation.

It is particularly desirable to employ steam. The steam not only irreversibly dehydrates the clays and prevents their swelling, but also affords the beneficial effects attendant steam flooding. Superheated steam may be employed initially to heat the formation. After the subterranean formation has been heated for a distance of about ten feet from the injection well with superheated steam, ordinary steam may be employed and the resulting condensate will form the slug of less-saline water. The higher temperatures effected by the steam injected into the subterranean formation also reduce the adsorption of surfactant onto the subterranean formation.

Figure 1B:
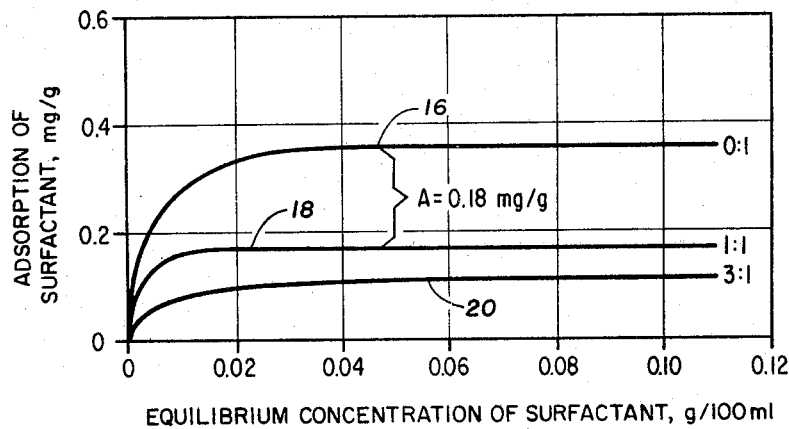

The mechanism of the invention is illustrated in FIGURES 1a and 1b. FIGURE 1a shows the amount of adsorbate which will adsorb on the surface of the subterranean formation from solutions or flooding waters of various salinities. FIGURE 1a summarizes the results of static adsorption tests made at 25° C. on disaggregated core samples of Loma Novia Sand, Loma Novia Field, Duval County, Tex. The surfactant employed was Alconate 80, a synthetic petroleum sulfonate mixture having an average molecular weight of about 420 and having molecular weights as high as 590. Solutions containing various concentrations of Alconate 80 were equilibrated with core samples and the final equilibrium solution concentrations determined. The depletion of Alconate 80 concentration in the solution afforded a measure of the adsorption of Alconate 80 at that concentration. The ordinate in FIGURE 1a is the Alconate 80 adsorbed in milligrams per gram of sand. The abscissa is the equilibrium concentration of Alconate 80 in the final solution in grams of Alconate 80 per 100 milliliters of solution. Curve 10 shows the adsorption of Alconate 80 from undiluted brine native to the Loma Novia Sand. This brine contains naturally about 1.2 percent by weight of sodium chloride and a minor amount of other dissolved solids, and there had been added 0.05 percent by weight of sodium carbonate and 0.1 percent by weight of sodium tripolyphosphate to help decrease interfacial tension and reduce adsorption. Curve 12 is an isotherm showing the adsorption of Alconate 80 from a solution formed by diluting the native brine 1:1 with water from a fresh water aquifer in the Loma Novia Field. The fresh water contained only about 0.07 percent by weight dissolved solids. Similarly, curve 14 is an isotherm showing the adsorption of Alconate 80 from solution formed by admixing one volume of the Loma Novia brine with 3 volumes of the fresh water. The diluted brine solutions also contained 0.05 percent by weight of sodium carbonate and 0.1 percent by weight of sodium tripolyphosphate. Not only is the adsorption of the surfactant from the flooding water reduced by these successively less-saline solutions but also the slopes of the isotherms are generally reduced by reducing the salinity of the water, shown more clearly in FIGURE 1b, for example. Most of the clay and silt had been removed from the sand from which the FIGURE 1b isotherms were obtained. The initial slopes are often taken as an indication of the strength and tenacity of adsorption and, hence, are of significance if a sorption-desorption chromatographic type of transport must be relied upon to achieve the desired minimum concentration of surfactant throughout a major portion of the reservoir. Such a type of transport usually must be relied upon in employing surfactants in waterflooding since it is rarely economically feasible to inject enough surfactant to satisfy substantially the adsorptive capacity of the entire formation. Further, in the method of the invention, the building of a second bank of surfactant depends upon the desorption potential realized by the equilibrium adsorption between solutions having different salinity. For example, in FIGURE 1b, curve 16 represents the equilibrium adsorption of the Loma Novia brine. Curve 18 represents the equilibrium adsorption of the Loma Novia brine mixed in the ratio of 1:1 with the fresh water, and curve 20 represents the equilibrium adsorption from a solution wherein the Loma Novia brine has been mixed in the proportion of 1:3 with fresh water. Thus, less-saline water injected behind the aqueous, saline surfactant solution will desorb surfactant from the subterranean formation and dissolve the surfactant under the desorption potential between the curves. For example, assuming the formation surfaces are saturated with surfactant by adsorption from the initial aqueous, saline surfactant solution containing 0.05 percent by weight Alconate 80, the less-saline water injected therebehind would desorb the amount A, equal to 0.18 milligram of surfactant, from each gram of subterranean formation with which it achieved equilibrium. The less-saline water, thus, would build to a concentration of Alconate 80 higher than 0.05. However, as illustrated in FIGURE 1b, the desorption potential remains essentially constant at higher concentrations. Therefore, the concentration of Alconate 80 would continue to build in the less-saline water.

As noted, the less-saline water will desorb, under a relatively constant desorption potential, and further, it will dissolve the surfactant and continue to build a higher concentration thereof over the entire interval of formation in which the preceding aqueous, saline surfactant solution was effective in displacing oil and onto which surfactant was adsorbed. The less-saline water thus builds a second surfactant bank which becomes effective in displacing oil within the subterranean formation.

Waterflooding is well known and no further description of this step appears to be necessary. Conventional equipment, such as wells, mixing tanks, pumps, and piping, which is ordinarily employed in waterflooding operations may be employed in carrying out this invention. Furthermore, the production equipment, such as water, knockouts, emulsion breakers, oil and gas separators, liquid level controls, backpressure controls, piping, storage tanks, and custody transfer equipment, may be employed in their conventional usage in carrying out this invention.

The following examples illustrate the building of a second bank of surfactant and its efficacy in recovering oil not recovered by waterflooding and by surfactant flooding.

Example 1

This example illustrates that a slug of less-saline water will desorb and pick up surfactant which has been adsorbed from a preceding aqueous, saline surfactant solution and build a concentrated bank of surfactant.

In this example, a Lucite tube one inch in diameter by twelve inches long was packed with washed, disassociated core sample from the Loma Novia Sand, Loma Novia Field, Duval County, Tex. The pore volume of the pack was measured, this measurement being made by determining the amount of liquid taken up by the pack following evacuation. The pack was saturated with Loma Novia brine and the following solutions were successively injected into the pack:

(1) 0.1 pore volume of Loma Novia brine containing 3 percent by weight of sodium carbonate,[1]
(2) 0.03 pore volume of Loma Novia brine containing 0.1 percent by weight of sodium carbonate and 0.1 percent by weight of sodium tripolyphosphate,[1]
(3) 0.1 pore volume of Loma Novia brine containing 1 percent by weight of Alconate 80, 0.05 percent by weight of sodium carbonate, and 0.1 percent by weight of sodium tripolyphosphate,[2] and
(4) 0.03 pore volume of Loma Novia brine containing 0.05 percent by weight of sodium carbonate, and 0.1 percent by weight of sodium tripolyphosphate.[2]

The last solution was injected until about 2.5 pore volumes had been injected and the concentration of Alconate 80 in the effluent had decreased to essentially zero.

Thereafter, a slug of less-saline water consisting of one part of Loma Novia brine and three parts of fresh water from the fresh water aquifer in the Loma Novia Field was prepared. Added to the slug of less-saline water were 0.05 percent by weight of sodium carbonate and 0.1 percent by weight of sodium tripolyphosphate. The sodium carbonate and the sodium tripolyphosphate were added to the water since, as mentioned in the footnotes, these would be employed, along with the sodium chloride, in a field operation to obtain desired interfacial behavior. The less-saline water was injected through the pack and the concentrations of Alconate 80 in the effluent were determined.

Figure 2:
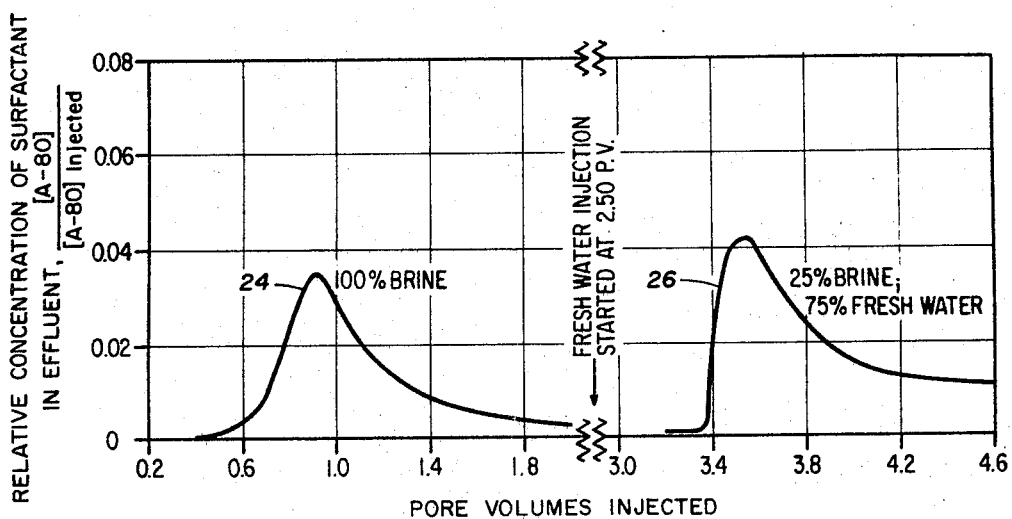
FIGURE 2 is a graph showing a slug of less-saline water building a concentration of surfactant when flowed behind an aqueous saline surfactant solution.

The results are shown in FIGURE 2. In FIGURE 2 the relative concentration of Alconate 80 in the effluent compared to the concentration of Alconate 80 in the aqueous, saline surfactant solution is the ordinate and the pore volumes of injected liquid, i.e., the solution No. 4 and the less-saline water, are the abscissa. The first peak 24 represents an increase in concentration of Alconate 80 just prior to the injection of 1 pore volume of solution No. 4. The second peak 26 shows that, just prior to injection of one pore volume of the less-saline water, the concentration of Alconate 80 in the effluent began to increase and after approximately one pore volume had been injected (approximately 3.5 total pore volumes of liquid) reached a maximum concentration greater than that obtained from solution No. 4. This second bank of surfactant solution was formed from desorption of surfactant left by the first bank of surfactant solution on the solid surfaces.

Example 2

This example illustrates that the bank of surfactant stripped by the less-saline water is effective in releasing oil from a pack following a waterflood, and a surfactant flood performed on the same pack.

In this example, a copper tube fifty feet long and 0.305 inch in diameter was packed with washed, disassociated core sample from the Loma Novia Sand as described in Example 1. The pack was saturated with Loma Novia brine. Thereafter, Loma Novia crude oil was injected into the pack to an irreducible water saturation, i.e., no more water was displaced from the pack by the injected oil. Thereafter, a waterflood was carried out by injecting Loma Novia brine into the pack. At the end of the waterflood, the end being taken as the point where the water-oil ratio of the effluent exceeded one hundred, the fluid saturation of the pack was 74 percent brine and 26 percent residual oil. Thereafter, a surfactant flood was carried out.

In the surfactant flood, 0.1 pore volume of Loma Novia brine containing 3.8 percent by weight of sodium carbonate was injected. This was followed by 0.05 pore volume of the brine containing 0.05 percent by weight of sodium carbonate and 0.1 percent by weight of sodium tripolyphosphate. Next, there was injected into the pack 0.1 pore volume of the brine containing as surfactant 2.1 percent by weight of Petronate L, a mixture of natural petroleum sulfonates having an average molecular weight of about 425 and having molecular weights as high as 590; 0.03 percent by weight of Pyronate 50, a mixture of synthetic petroleum sulfonates having an average molecular weight of about 360 and having molecular weights as low as 290; 0.08 percent by weight Kelzan, a polysaccharide prepared by the fermentation of glucose by bacterium Xanthomonas campestris NRRL B-1459, United States Department of Agriculture, and used to increase the viscosity of the brine; 0.02 percent by weight of formaldehyde, used as a preservative for the Kelzan; 0.1 percent by weight of sodium tripolyphosphate; and 0.05 percent by weight of sodium carbonate. Finally, Loma Novia brine containing 0.05 percent by weight of sodium carbonate was injected until no more oil was being removed from the pack in the effluent stream.

Figure 3:
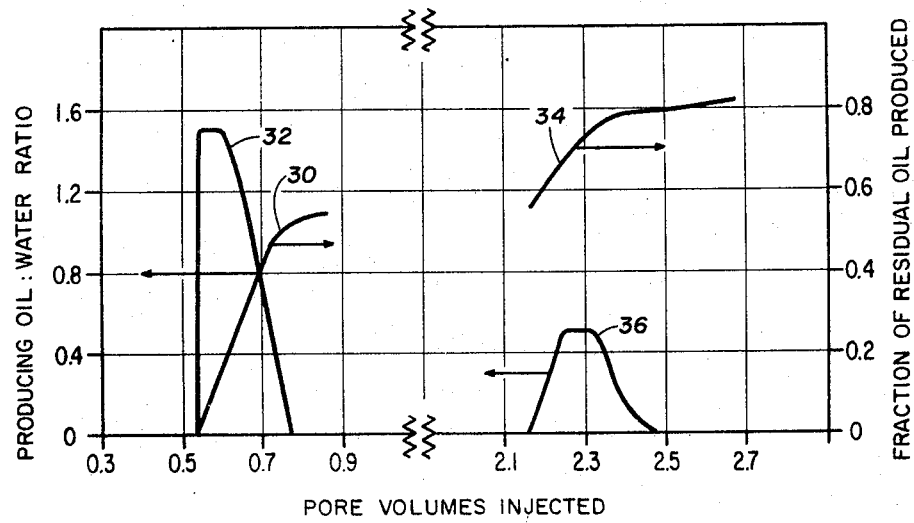
FIGURE 3 is a graph showing the increased production of oil from a simulated subterranean formation by employing the method of the invention.

The data are summarized in FIGURE 3. As shown by curve 30 in FIGURE 3, 53.9 percent of the residual oil remaining after the water flood was produced by this surfactant flood. Curve 32 shows an accompanying increase in oil-water ratio.

Thereafter, a slug of 0.1 pore volume of less-saline water consisting of one part of Loma Novia brine and three parts of fresh water from the fresh water aquifer, containing 0.05 percent by weight of sodium carbonate, and containing 0.08 percent by weight of Kelzan, was passed through the pack.

As shown by curve 34, which is a cumulative oil recovery curve, the less-saline water recovered an additional 26 percent of the residual oil over that recoverable by the surfactant flood. The less-saline water desorbed surfactant from the core sample and built a second bank of surfactant solution which released the additional oil.

---

[1] The sodium carbonate, and the combination of sodium carbonate and sodium tripolyphosphate, are included in the Loma Novia brine to reduce the adsorption of the surfactant onto the core sample.

[2] The sodium carbonate, and the combination of sodium carbonate and sodium tripolyphosphate, are included in the solution of surfactant since these, along with the sodium chloride, would usually decrease interfacial tension between the surfactant solution and the oil in the formation and improve the water wettability.

The additional oil appears as a second bank of oil production depicted by curve 36, showing an increase in oil-water ratio.

What is claimed is:

1. In a method of recovering oil from a subterranean formation containing oil and having at least one injection well and at least one production well, the improvement comprising the steps of:
   (a) injecting through an injection well and into said subterranean formation an aqueous, saline surfactant solution containing 1 to 2 percent by weight of sodium chloride and sufficient surfactant to effect an interfacial tension between said aqueous, saline surfactant solution and said oil of less than about 0.1 dyne per centimeter,
   (b) injecting through said injection well and immediately following said aqueous, saline surfactant solution a slug of less-saline water having a concentration of sodium chloride less than 50 percent of that of said aqueous, saline surfactant solution and free of salts having divalent cations,
   (c) thereafter injecting through said injection well and into said subterranean formation flooding water containing at least 1 percent by weight of sodium chloride, and
   (d) producing oil from a production well.

2. The method of claim 1 wherein said flooding water is an oil field brine.

3. The method of claim 2 wherein a buffer slug of from about 0.01 to about 0.2 pore volume, inclusive, of water free of salts having divalent cations and having a salinity not greater than that of said less-saline water is injected through said injection well and into said subterranean formation behind said slug of less-saline water and in front of said brine.

4. The method of claim 1 wherein said surfactant is a mixture of petroleum sulfonates having a median molecular weight of from about 375 to about 430, having molecular weights between 290 and 590, no more than 10 percent by weight having an average molecular weight less than 290, and no more than 15 percent by weight having an average molecular weight greater than 590.

5. The method of claim 3 wherein said petroleum sulfonates have a median molecular weight of from about 400 to about 430.

6. The method of claim 1 wherein said less-saline water has a concentration of sodium chloride from 10 to 20 percent of that of said aqueous, saline surfactant solution.

7. The method of claim 1 wherein said aqueous, saline surfactant solution is injected in an amount of from 0.01 to 0.2 pore volume.

8. The method of claim 1 wherein said less-saline water is injected in an amount of from about 0.05 to about 0.2 pore volume.

9. The method of claim 7 wherein said less-saline water is injected in an amount of from about 0.1 to about 0.2 pore volume.

10. The method of claim 1 wherein a buffer slug of from about 0.01 to about 0.2 pore volume, inclusive, of water free of salts having divalent cations and having about the same salinity as said aqueous, saline surfactant solution, but containing less than 2 percent by weight sodium chloride, is injected through said injection well and into said subterranean formation ahead of said aqueous, saline usrfactant solution.

11. In a method of recovering oil from a subterranean formation containing oil and having at least one injection well and at least one production well, said formation containing clay which swells and disperses upon contact with water of low salinity, the improvement comprising the steps of:
   (a) injecting through an injection well and into said subterranean formation an aqueous, saline surfactant solution containing 1 to 2 percent by weight of sodium chloride and sufficient surfactant to effect an interfacial tension between said aqueous, saline surfactant solution and said oil of less than about 0.1 dyne per centimeter,
   (b) injecting through said injection well and immediately following said aqueous, saline surfactant solution steam to form by condensation in said formation a slug of less-saline water having a concentration of sodium chloride less than 50 percent of that of said aqueous, saline surfactant solution and free of salt having divalent cations,
   (c) thereafter injecting through said injection well and into said subterranean formation flooding water containing at least 1 percent by weight of sodium chloride, and
   (d) producing oil from a production well.

12. The method of claim 11 wherein said steam injected into said formation is initially superheated steam and subsequently ordinary steam, the superheated steam being injected into said formation to heat said formation for a distance of about 10 feet from said injection well.

References Cited

UNITED STATES PATENTS

| 2,800,962 | 7/1957 | Garst | 166—9 |
| 3,160,205 | 12/1964 | Harvey et al. | 166—9 |
| 3,289,759 | 12/1966 | Fisher | 166—9 |
| 3,302,713 | 2/1967 | Ahearn et al. | 166—9 |
| 3,343,597 | 9/1967 | Gogarty et al. | 166—9 |
| 3,346,047 | 10/1967 | Townsend et al. | 166—9 |
| 3,348,611 | 10/1967 | Reisberg | 166—9 |
| 3,369,602 | 2/1968 | Fallgatter et al. | 166—9 |

FOREIGN PATENTS

| 728,489 | 2/1966 | Canada. |

CHARLES E. O'CONNELL, Primary Examiner

IAN A. CALVERT, Assistant Examiner

U.S. Cl. X.R.

166—273, 275

PO-1050
(5/69)

UNITED STATES PATENT OFFICE
CERTIFICATE OF CORRECTION

Patent No. 3,474,864    Dated October 28, 1969

Inventor(s) Billy G. Hurd

It is certified that error appears in the above-identified patent and that said Letters Patent are hereby corrected as shown below:

Column 1, line 69, "efficency" should read --efficiency--.
Column 2, line 44, "water" should read --waters--.
Column 5, line 1, "previouslsy" should read --previously--;
          line 44, "wtih" should read --with--.
Column 9, line 43 (claim 5, line 1), "The method of claim 3" should read --The method of claim 4--;
          line 55 (claim 9, line 1), "The method of claim 7" should read --The method of claim 8--.
Column 10, line 2 (claim 10, line 2), after "inclusive" insert a comma (,);
          line 8 (claim 10, line 8), "usrfactant" should read --surfactant--;
          line 55, The Assistant Examiner's name should read --Ian A. Calvert--.

SIGNED AND
SEALED
MAY 26 1970

(SEAL)
Attest:

Edward M. Fletcher, Jr.
Attesting Officer

WILLIAM E. SCHUYLER, JR.
Commissioner of Patents